Nov. 2, 1943.                E. HIGGINS                2,333,422
                AUTOMATIC CONTROLS FOR PRESSURE PUMPS
                  Filed June 29, 1942        2 Sheets-Sheet 1

INVENTOR.
Eugene Higgins
BY
Earl F. Chappell

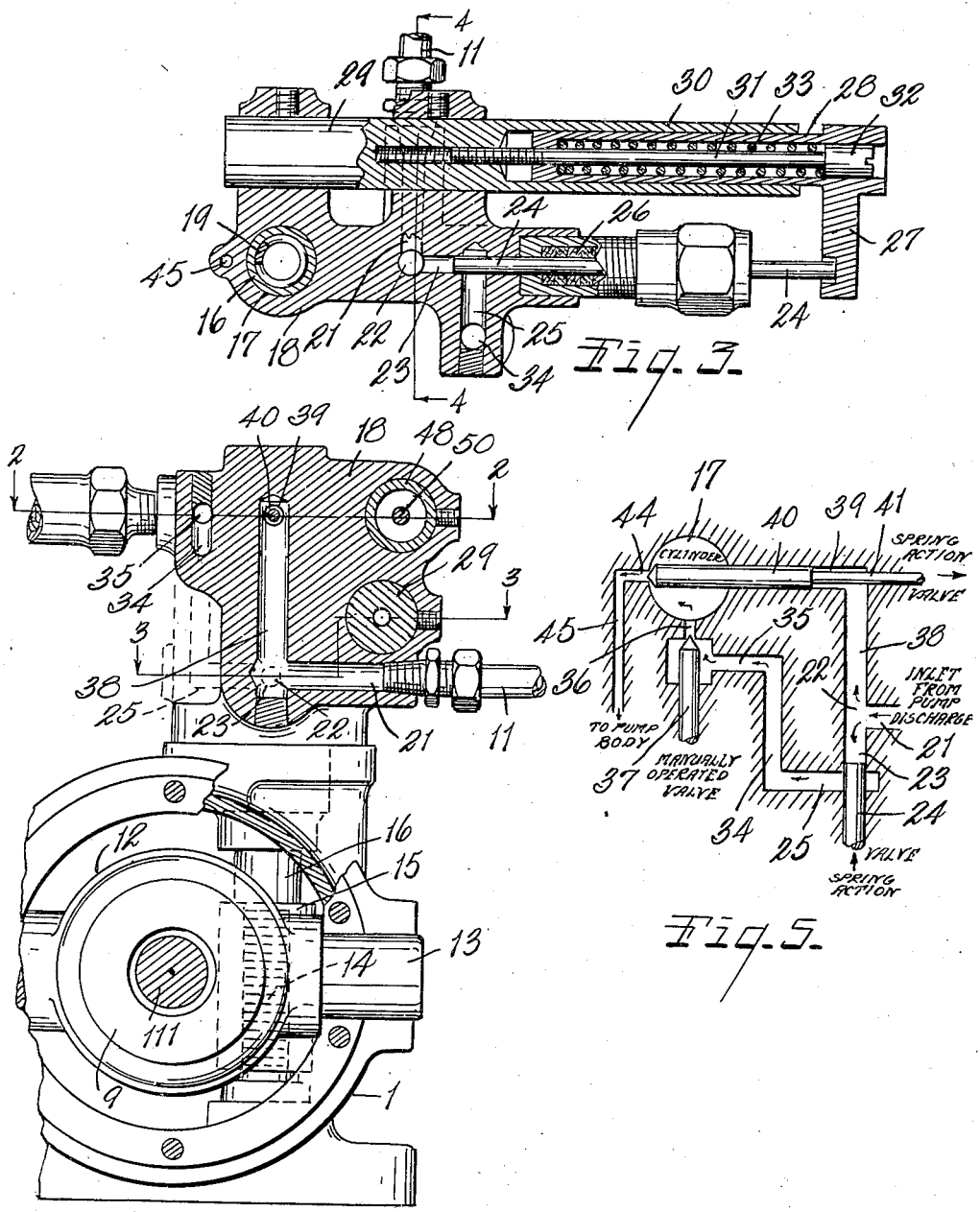

Patented Nov. 2, 1943

2,333,422

UNITED STATES PATENT OFFICE 2,333,422

AUTOMATIC CONTROL FOR PRESSURE PUMPS

Eugene Higgins, Jackson, Mich.

Application June 29, 1942, Serial No. 448,942

17 Claims. (Cl. 103—162)

This invention relates to improvements in automatic controls for pressure pumps.

The main objects of this invention are:

First, to provide a constant pressure pumping system including a pump adapted to be driven by any suitable prime mover and equipped with a pressure regulator responsive to the pressure of fluid pumped to effect alterations in the volumetric displacement by the pump in accordance with variations in said pressure and thereby maintain the pressure within desired limits.

Second, to provide a system of the type described, wherein regulation of the pressure in the system is automatically attained by control of and responsive to the pump output.

Third, to provide a system of the type described, including a pump embodying a plurality of plungers carried on a rotary barrel member parallel to the axis thereof and actuated by sliding engagement with a circular inclined cam, and novel pressure regulating means associated with said pump to automatically adjust the angle of inclination of the cam, thereby varying the plunger stroke and displacement of the pump, so as to maintain the pressure of the pump output constant or substantially so.

Fourth, to provide a novel pressure regulator for a pump, including means for quickly and easily varying the desired minimum and maximum pumping pressures maintained by said regulator.

Fifth, to provide a hydraulic pressure regulator connected to a pump control element effective to alter the volumetric displacement of the pump and responsive to variations in pressure of the pump output to adjust said element and thereby offset and correct said variations, said regulator being capable of being set to maintain any desired range between maximum and minimum permissible pumping pressures.

Sixth, to provide a regulator of the type described, which is exceedingly simple and compact and which requires little attention in adjusting or setting the same, and no attention in its operation thereafter.

Objects relating to details and economies of the invention will appear from the description to follow. The invention is defined in the claims.

Preferred embodiments of the invention are illustrated in the accompanying drawings, in which:

Fig. 3 is a fragmentary view in section on a line corresponding to line 3—3 of Figs. 1 and 4.

Fig. 4 is a fragmentary view in section on a line corresponding to line 4—4 of Figs. 1, 2, and 3, and Fig. 5 is a simplified, diagrammatic sectional view illustrating conventionally the structure and operative relationships of the essential elements of the regulator, being laid out in a single plane for the purpose of clarity and ease of understanding.

Figure 1:
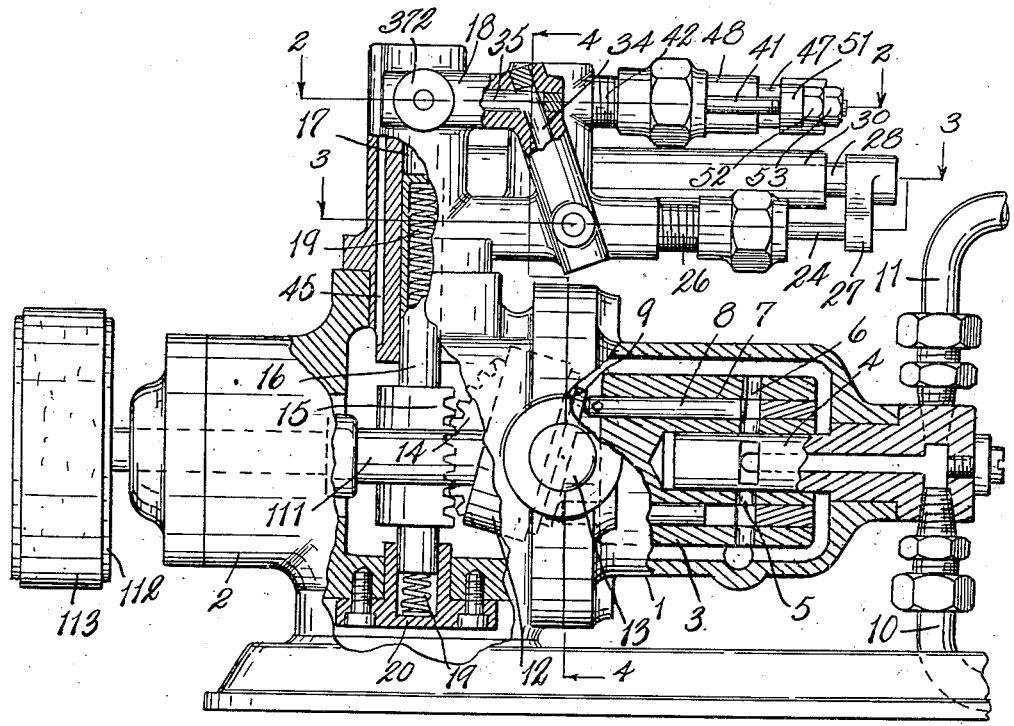
Fig. 1 is a fragmentary view in side elevation, partially broken away and in vertical longitudinal section, illustrating essential elements of a constant pressure pumping system in accordance with the invention, particularly illustrating certain structural features of the pressure regulator incorporated therein, likewise certain details of the pump of said system.
Figure 2:
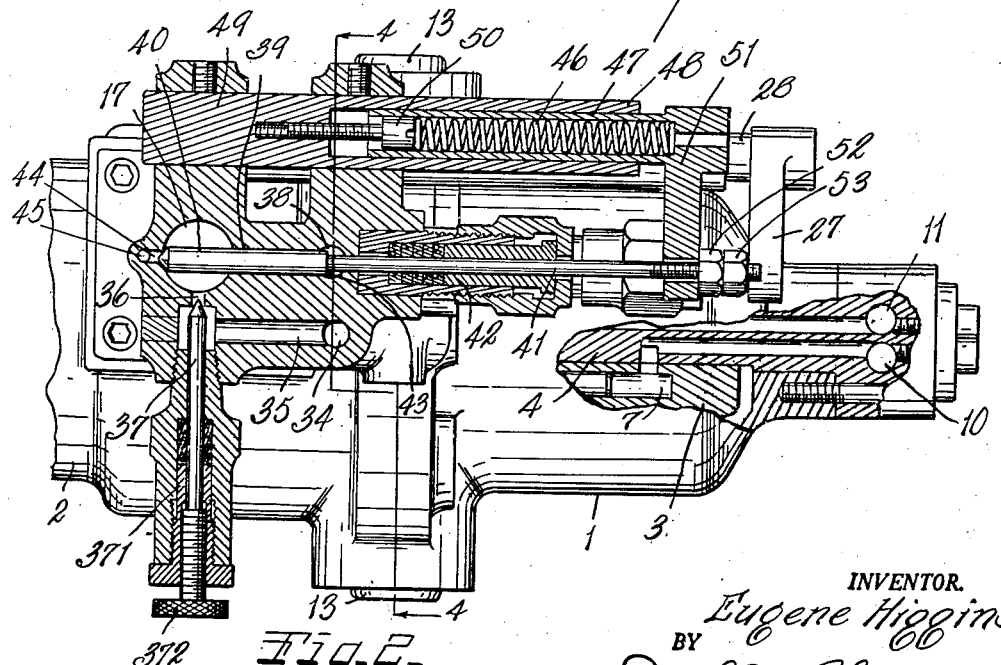
Fig. 2 is an enlarged fragmentary view in section on a line corresponding to line 2—2 of Figs. 1 and 4.

I have illustrated my present invention as embodied in a pumping system of the type illustrated and described in my Patent No. 2,237,430 of April 8, 1941, which includes a pump provided with a barrel rotating about a longitudinal axis and provided with a plurality of cylinders parallel to said axis in which plungers are reciprocably disposed, said plungers being actuated as they are rotatably carried with said barrel by sliding engagement with an inclined cam track or wobble plate, which is journalled on an axis transverse the barrel axis. The inclination of said wobble plate is adjustable to vary the stroke of the plungers and thereby vary the volumetric output of the pump.

The present invention in this embodiment illustrated provides a pressure system including an automatic pressure regulator operatively connected to the aforesaid cam track means, the regulator being responsive to pressure in the circulatory system supplied by said pump for automatically adjusting the angle of inclination of the cam track appropriately and thereby appropriately varying the output of the pump in a manner to raise the pressure should it fall below a desired permissible minimum or decrease the pressure should it rise above a permissible maximum. It will be perceived that the system is a self-contained one in which the regulatory action produced in response to output pressure variations is exerted on the pumping mechanism itself to adjust the volumetric displacement, so that said system is independent entirely of the pump prime mover as to the regulation, i. e., without any operations being performed on said prime mover, as by adjusting the speed of operating characteristics of the latter.

Referring to the drawings, the reference numeral 1 designates a pump of the type referred to above and illustrated in my Patent No. 2,237,430, including a casing 2 in which an elongated barrel 3 is rotatably journaled for rotation concentrically on a ported shaft 4 provided with axial passages 5, 6 through which liquid is supplied to the pump and discharged therefrom. Barrel 3 is provided with a plurality of cylinders 7 disposed parallel to the axis thereof, in which the spring urged plungers 8 are mounted for reciprocation. Said plungers at their rear ends bear against and slide on an inclined cam tack or wobble plate, generally designated 9 for reciprocable actuation thereby in one direction as the barrel rotates. Return reciprocation in the opposite direction is effected in known manner by springs (not shown) associated with the plungers. As the barrel rotates and plungers 8 reciprocate, liquid is drawn into the cylinders 7 and discharged therefrom through passages 5, 6, and the connected pump intake line 10 and a discharge line 11. Further details of the operation of a pump of this type may be had by reference to my patent identified above.

The barrel 3 is rotated by a shaft 111 suitably secured thereto and extending externally of the housing 2, at which point it is provided with a pulley 112 driven by a belt 113 from any appropriate prime mover.

The intake and discharge lines 11 constitute parts of a circulatory system or delivery of any desired nature wherein it is desired to circulate or deliver a liquid for any purpose at a constant or approximately constant pressure. In accordance with the present invention the regulator device or mechanism constituting an important part of the subject matter thereof is operatively connected to this circulatory or delivery system so as to be subject to and responsive to the pressure therein. Such connection may be effected at any desired point in the system, and in the description to follow, for purposes of simplicity, it has been chosen to indicate the regulator as suitably connected to the pump discharge line 11, although it will be appreciated, as stated above, that this point is chosen arbitrarily to simplify the disclosure.

In accordance with the present invention the cam track 9 is carried by a mounting member 12 provided with trunnions 13 swiveling the same in the housing 2 or appropriate part thereof, on an axis traversely intersecting the axis of shaft 111. Member 12 is provided with a gear segment 14 rearwardly thereof which meshes with an actuator rack 15 on a hollow plunger 16 constituting a part of the pressure regulator. Said plunger is slidably reciprocable vertically in a cylinder bore 17 provided therefor in an integral regulator fitting 18, carrying appropriate means for bolting or otherwise securing the same to the pump housing.

The spring 19 disposed within the plunger 16 actuates the plunger in one direction, i. e., upwardly, as viewed in Fig. 1. The spring is seated on the closure plate 20 secured to the casing and in effect constituting a part thereof.

The plunger 16 is actuated in the opposite direction or against the tension of the spring by hydraulic pressure in the cylinder 17. Thus, if the pressure exceeds a predetermined amount, the plunger is actuated against the tension of the spring 19, thereby through the rack 15 thereon, angularly shifting the cam track carrying member 12 and properly adjusting the angle of the cam track 9.

When the hydraulic pressure in the cylinder 17 drops below a predetermined amount as results from the opening of the exhaust or bleeder valve 40, the spring actuates the plunger in the opposite direction and oppositely adjusts the cam member 12.

Figs. 1 to 4 of the drawings are sections of the regulator device and illustrate the structure and the relationship of the various operating elements thereof, various passages and the like embodied in the regulator casing 18 and serving to control the hydraulic pressure in the cylinder 17. These various passages are arranged so that they can be easily formed by drilling or suitably reamed if formed in a cord casting.

In the interests of clarity, I have provided a further diagrammatic and conventionalized illustration in Fig. 5 in which the passages and valve are arranged or laid out in a single plane. A reference to Fig. 5 will be found convenient in connection with the description of the reference numerals as they are applied to Figs. 1 to 4 inclusive.

Referring to Figs. 3 and 4, the regulator body or casing is provided with an intake passage 21 to which the circulatory system is connected, namely, the pipe or line 11. At the inner end of the intake passage 21 is a passage 22 which in turn communicates with a cylindrical passage 23 which constitutes a cylinder for the plunger valve 24. The valve 24 controls the delivery between the bore 23 and the delivery passage 25.

The plunger valve 24 is provided with a suitable packing designated generally by the numeral 26. The outer end or stem portion of the valve is engaged by the arm 27 on the tubular guide member 28 reciprocable in the tubular support 29 having a tubular portion 30 slidably receiving the guide member 28. The support 29 is mounted on the control body member.

A rod-like spring adjusting member 31 is threaded into the support 29, being provided with a head 32 constituting a seat for the outer end of the spring 33 disposed within the guide member and seating on the inner end thereof. This spring 33 serves to urge the valve to closed position, acting to the left, as viewed in Fig. 3.

Assuming that it is desired to maintain the pressure in the system between the minimum of 480 pounds and the maximum of 500 pounds, the spring will be of such capacity and the tension thereof adjusted so that it maintains or holds the valve in closed position at pressures below 500 pounds per square inch, yielding at this pressure to allow fluid to pass into the passage 25. In the embodiment illustrated, the passage 25 communicates with the diagonally disposed passages 34, see Figs. 1 and 2, which in turn communicates with the passage 35 and a flow regulator port 36 controlled by the manually adustable needle valve 37, and thence to the cylinder. Thus, when the pressure in the system exceeds 500 pounds per square inch, in the assumed example, connection is established through the passages 21, 22, the valve bore cylinder 23, passages 25, 34 and 36, to the cylinder. The regulating valve controls this flow and the consequent speed of actuation of the plunger. The needle valve 37 is provided with a suitable packing 371 and finger piece 372. This arrangement controls the maximum pressure.

In cooperating relation, means are provided for controlling minimum pressure assumed, for example, to be 480 pounds per square inch. In the embodiment illustrated, this passage 21 also communicates with the passage 38 which in turn opens to the bore 39 supporting the valve 40 which is provided with a stem 41 provided with a suitable packing designated generally by the numeral 42.

It will be noted that the diameter of the valve 40 is substantially greater than that of its stem 41 thereby exposing an annular pressure face 43 to the pressure within the passage 38. This pressure acts to move the valve 40 to the left as viewed in Fig. 2. The conical tip of the valve coacts with the cylinder exhaust or bleeder port 44 and is held to its seat by the fluid pressure when the fluid pressure is in excess of 480 pounds. In the embodiment illustrated, the exhaust or bleeder port is provided with a discharge passage 45 which discharges to the interior of the pump casing from which it may be drained to the sump of the pump. When the seating pressure on the valve 40 falls below the predetermined amount, for example 480 pounds, the valve is opened by a spring means arranged similarly to that described for the valve 24 but acting to open the valve instead of closing it. This means comprises the compression spring 46 housed in the tubular guide 47 slidably mounted in the tubular end 48 of the supporting member 49 which is suitably secured on the control housing or body at its inner end, the spring 46 abutting the screw threaded abutment member 50 which is threaded into the member 49 for regulating the tension of the spring.

The arm 51 on the guide is provided with an opening through which the valve stem 41 extends, the stem being provided with thrust and adjusting nuts 52 and 53. An adjustment may also be effected at this point.

The spring 46 is of such capacity and adjusted so that the hydraulic pressure on the valve 40 cannot exceed it until the force of the spring is overcome and in the assumed example this would be 480 pounds per square inch. Therefore, at pressures below this, the cylinder exhaust or bleeder port 44 is opened so that the plunger return spring returns the plunger and shifts the cam track and thereby increases the output of the pump. The pump structure illustrated is a constant speed variable output. When the pressure is above or exceeds 480 pounds, the valve 40 is closed and no further action of the control mechanism takes place until the pressure exceeds the maximum for which it is set.

It will be obvious that the maximum and minimum pressures may be varied. The figures here given are purely arbitrary for purposes of illustration.

The operation of the regulator is entirely automatic in operation after once being adjusted for the desired pressure limits. It is effective to meet any conditions tending to cause an increase or decrease in pressure of the circulatory system above or below said permissible limits by a corresponding corrective action appropriately varying the output of the pump included in the circulatory system. Such corrections are quickly and smoothly effected, without rapid and abrupt surges such as would induce a hunting condition in the regulator operation. In a system incorporating a pump of the type under consideration in which reciprocable plungers are carried rotatably with relation to normal fixed though angularly adjustable angular cam surfaces, a regulator of this type functions independently of the other elements of the system such as the prime mover to effect desired pressure corrections in response to pressure corrections in response to pressure rises or drops calling for such correction.

I have illustated and described my improvements in embodiments which I have found very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. In a constant pressure pumping apparatus, a pump supplying a circulatory system, said pump including means to regulate the volumetric displacement thereof, and a pressure regulator connected to and responsive to pressure in said circulatory system, comprising a control plunger, a control spring urging the same in one direction, and means operatively connecting the plunger to said first named means for regulating said volumetric displacement in response to movements of the plunger caused by said pressure, a cylinder in which said plunger is reciprocatingly received, including a pressure chamber at one end of the plunger provided with a by-pass opening, a liquid passage to said chamber in communication with the pressure in said circulatory system, a reciprocable plunger valve coacting with said by-pass opening to control the same, a spring operatively connected to said valve tending to urge the same in a direction to uncover said opening, said valve being communicated with and subject to the pressure in said passage and tending to be urged thereby in a direction to overcome the force of said spring and cover said opening at pressures below a predetermined minimum, a second plunger valve disposed in and subject in common with said first valve to the pressure in said passage, a spring maintaining said second valve in obstructing position, said second valve being normally effective to obstruct the passage at pressures therein below a predetermined maximum and yielding in opposition to its spring at pressures above said maximum to open communication through said passage to said chamber, whereby said chamber by-pass opening is covered and said second named valve retracted to open unobstructing position at pressures above said maximum for actuation of said control plunger under the pressure transmitted to said pressure chamber, and whereby said by-pass opening is uncovered at pressures below said minimum for actuation of the control plunger, to thereby actuate said displacement regulating means in the manner required.

2. In a constant pressure pumping apparatus, a pump supplying a circulatory system, said pump including means to regulate the volumetric displacement thereof, and a pressure regulator connected to and responsive to pressure in said circulatory system, comprising a control plunger, a control spring urging the same in one direction, and means operatively connecting the plunger to said first named means for regulating said volumetric displacement in response to movements of the plunger caused by variations in said pressure, a cylinder in which said plunger is reciprocatingly received, including a pressure chamber at one end of the plunger provided with a by-pass opening, a liquid passage to said chamber in communication with the pressure in said circulatory system, a valve coacting with said by-pass opening to control the same, biasing means connected to said valve tending to urge the same in a direction to uncover said opening, said valve being communicated with and subject to the pressure in said passage and tending to be urged thereby in a direction to overcome the force of said biasing means and cover said opening at pressures below a predetermined minimum, a second valve disposed in and subject in common with said first valve to the pressure in said passage, biasing means maintaining said second valve in obstructing position, said second valve being normally effective to obstruct the passage at pressures therein below a predetermined maximum and yielding in opposition to its biasing means at pressures above said maximum to open communication through said passage to said chamber, whereby said chamber by-pass opening is covered and said second named valve retracted to open unobstructing position at pressures above said maximum for actuation of said control plunger under the pressure transmitted to said pressure chamber, and whereby said by-pass opening is uncovered at pressures below said minimum for actuation of the control plunger, to thereby actuate said displacement regulating means in the manner required.

3. In an apparatus of the type described, a hydraulic work performing device in hydraulic operating and pressure transmitting relation to a predetermined hydraulic system, said device including means to regulate the work output thereof, and a pressure regulator connected to and responsive to pressure in said system, comprising a control plunger, a control spring urging the same in one direction, and means operatively connecting the plunger to said first named means for regulating said work output in response to movements of the plunger caused by variations in said pressure, a cylinder in which said plunger is reciprocatingly received, including a pressure chamber at one end of the plunger provided with a by-pass opening, a liquid passage to said chamber in communication with the pressure in said sytem, a valve coacting with said by-pass opening to control the same, biasing means connected to said valve tending to urge the same in a direction to uncover said opening, said valve being communicated with and subject to the pressure in said passage and tending to be urged thereby in a direction to overcome the force of said biasing means and cover said opening at pressures below a predetermined minimum, a second valve disposed in and subject in common with said first valve to the pressure in said passage, biasing means maintaining said second valve in obstructing position, said second valve being normally effective to obstruct the passage at pressures therein below a predetermined maximum and yielding in opposition to its biasing means at pressures above said maximum to open communication through said passage to said chamber, whereby said chamber by-pass opening is covered and said second named valve retracted to open unobstructing position at pressures above said maximum for actuation of said control plunger under the pressure transmitted to said pressure chamber, and whereby said by-pass opening is uncovered at pressures below said minimum for actuation of the control plunger, to thereby actuate said output regulating means in the manner required.

4. A constant pressure regulating device for a liquid circulatory system including a hydraulic work performing device having rotatable cylinders and plungers reciprocable therein parallel to the axis of rotation of the cylinders, and an inclined cam engageable by said plungers in the rotation thereof, said device comprising a reciprocable control plunger and a control cylinder slidably receiving the same, means for operatively connecting said control plunger to said cam for adjusting the inclination thereof and thereby regulating the output of the device, said control cylinder including a pressure chamber at one end of said plunger and the plunger being subject to pressure in said chamber above a predetermined maximum to shift the plunger in one direction for corresponding adjustment of said cam, spring means for shifting the control plunger in the opposite direction when the pressure in said chamber is below a predetermined minimum, with corresponding opposite adjustment of the cam, the hydraulic circuit of said device being communicated with said chamber by means including a communicating passage having a spring urged plunger valve reciprocable therein normally obstructing the same, but retractable to open the passage when the pressure therein exceeds a predetermined maximum value, said chamber having a bleeder opening, a second valve controlling said bleeder opening, said second valve being subject to the pressure in said passage and being spring urged to uncover said bleeder opening and reduce said chamber pressure when the passage pressure falls below a predetermined minimum, said control plunger spring means actuating the control plunger in said last named event and the pressure in said chamber actuating the control plunger reversely when said bleeder opening is closed by said second valve under a pressure in said line above said maximum, and means for adjusting the force exerted by the springs controlling said valves to regulate the values of said maximum and minimum.

5. A constant pressure regulating device for a liquid circulatory system including a hydraulic work performing device having an output regulating member, said device comprising a reciprocable control plunger and a control cylinder slidably receiving the same, means for operatively connecting said control plunger to said member for adjusting the same and thereby regulating the output of the device, said control cylinder including a pressure chamber at one end of said plunger and the plunger being subject to pressure in said chamber above a predetermined maximum to shift the plunger in one direction for corresponding adjustment of said member, spring means for shifting the control plunger in the opposite direction when the pressure in said chamber is below a predetermined minimum, with corresponding opposite adjustment of the member, the hydraulic circuit of said device being communicated with said chamber by means including a communicating passage having a spring urged plunger valve reciprocable therein normally obstructing the same, but retractable to open the passage when the pressure therein exceeds a predetermined maximum value, said chamber having a bleeder opening, said second valve being subject to the pressure in said passage and being spring urged to uncover said bleeder opening and reduce said chamber pressure when the passage pressure falls below a predetermined minimum, said control plunger spring means actuating the control plunger in said last named event and the pressure in said chamber actuating the control plunger reversely when said bleeder opening is closed by said second valve under a pressure in said line above said maximum, and means for adjusting the force exerted by the springs controlling said valves to regulate the values of said maximum and minimum.

6. A constant pressure regulating device for a liquid circulatory system including a hydraulic work performing device having an output regulating member, said device comprising a reciprocable control plunger and a control cylinder slidably receiving the same, means for operatively connecting said control plunger to said member for adjusting the same and thereby regulating the output of the device, said control cylinder including a pressure chamber at one end of said plunger and the plunger being subject to pressure in said chamber above a predetermined maximum to shift the plunger in one direction for corresponding adjustment of said member, spring means for shifting the control plunger in the opposite direction when the pressure in said chamber is below a predetermined minimum, with corresponding opposite adjustment of the member, the hydraulic circuit of said device being communicated with said chamber by means including a communicating passage having a valve therein normally obstructing the same, but retractable to open the passage when the pressure therein exceeds a predetermined maximum value, said chamber having a bleeder opening, and a second valve controlling said bleeder opening, said second valve being subject to the pressure in said passage and being shiftable to uncover said bleeder opening and reduce said chamber pressure when the passage pressure falls below a predetermined minimum, said control plunger spring means actuating the control plunger in said last named event and the pressure in said chamber actuating the control plunger reversely when said bleeder opening is closed by said second valve under a pressure in said line above said maximum.

7. In combination with a pump having means to regulate the volumetric output thereof, a constant pressure regulating device comprising a reciprocable control plunger and a control cylinder slidably receiving the same, means for operatively connecting said control plunger to said regulating means to adjust the output of the device, said control cylinder including a pressure chamber at one end of said plunger and the plunger being subject to pressure in said chamber above a predetermined maximum to shift the plunger in one direction for corresponding adjustment of said means, spring means for shifting the control plunger in the opposite direction when the pressure in said chamber is below a predetermined minimum, with corresponding opposite adjustment of said regulating means, the hydraulic output circuit of said pump being communicated with said chamber by means including a communicating passage having a spring urged plunger valve reciprocable therein normally obstructing the same, but retractable to open the passage when the pressure therein exceeds a predetermined maximum value, said chamber having a bleeder opening, a second valve controlling said bleeder opening, said second valve being subject to the pressure in said passage and being spring urged to uncover said bleeder opening and reduce said chamber pressure when the passage pressure falls below a predetermined minimum, said control plunger spring means actuating the control plunger in said last named event and the pressure in said chamber actuating the control plunger reversely when said bleeder opening is closed by said second valve under a pressure in said line above said maximum, and means for adjusting the force exerted by the springs controlling said valves to regulate the values of said maximum and minimum.

8. In combination with a pump having means to regulate the volumetric output thereof, a constant pressure regulating device comprising a reciprocable control plunger and a control cylinder slidably receiving the same, means for operatively connecting said control plunger to said regulating means to adjust the output of the device, said control cylinder including a pressure chamber at one end of said plunger and the plunger being subject to pressure in said chamber above a predetermined maximum to shift the plunger in one direction for corresponding adjustment of said means, spring means for shifting the control plunger in the opposite direction when the pressure in said chamber is below a predetermined minimum, with corresponding opposite adjustment of said regulating means, the hydraulic output circuit of said pump being communicated with said chamber by means including a communicating passage having a spring urged plunger valve reciprocable therein normally obstructing the same, but retractable to open the passage when the pressure therein exceeds a predetermined maximum value, said chamber having a bleeder opening, and a second valve controlling said bleeder opening, said second valve being subject to the pressure in said passage and being spring urged to uncover said bleeder opening and reduce said chamber pressure when the passage pressure falls below a predetermined minimum, said control plunger spring means actuating the control plunger in said last named event and the pressure in said chamber actuating the control plunger reversely when said bleeder opening is closed by said second valve under a pressure in said line above said maximum.

9. In a constant pressure pumping apparatus, a pump supplying a circulatory system, said pump including means to vary the volumetric displacement thereof, and a pressure regulator connected to and responsive to the pressure in said circulatory system comprising a cylinder and its coacting plunger, a spring acting to urge the plunger in one direction, means operatively connecting the plunger to said volumetric displacement means in response to variations in the movement of the plunger caused by said pressure, a liquid delivery connection to said cylinder in pressure transmitting connection with said circulatory system, a plunger exhaust valve for said cylinder, a spring acting to open said exhaust valve, said plunger valve being subject to the pressure of said circulatory system whereby it is seated when the pressure therein is sufficient to overcome the force of said spring, the spring acting to open the valve when the pressure falls below a predetermined minimum, a plunger inlet valve for said cylinder subject in common with said exhaust valve to the pressure in said circulatory system, a spring acting to maintain said inlet valve in closed position while the pressure in said circulatory system is below a predetermined maximum, and a flow regulating valve between said inlet valve and said cylinder.

10. In a constant pressure pumping apparatus, a pump supplying a circulatory system, said pump including means to vary the volumetric displacement thereof, and a pressure regulator connected to and responsive to the pressure in said circulatory system comprising a cylinder and its coacting plunger, a spring acting to urge the plunger in one direction, means operatively connecting the plunger to said volumetric displacement means in response to variations in the movement of the plunger caused by said pressure, a liquid delivery connection to said cylinder in pressure transmitting connection with said circulatory system, a plunger exhaust valve for said cylinder, a spring acting to open said exhaust valve, said plunger valve being subject to the pressure of said circulatory system whereby it is seated when the pressure therein is sufficient to overcome the force of said spring, the spring acting to open the valve when the pressure falls below a predetermined minimum, a plunger inlet valve for said cylinder subject in common with said exhaust valve to the pressure in said circulatory system, and a spring acting to maintain said inlet valve in closed position while the pressure in said circulatory system is below a predetermined maximum.

11. The combination with a constant speed variable output pressure pump, of a rockably mounted control member provided with a toothed segment, a control cylinder provided with a plunger having a rack coacting with said segment, a return spring for said plunger, a fluid seated exhaust valve for said cylinder subject to the discharge pressure of the pump, an adjustable spring coacting to open said exhaust valve when the pump discharge pressure falls below a predetermined amount, a pressure actuated inlet valve for said cylinder subject to the discharge pressure of the pump to be actuated thereby to open position when the pump discharge pressure exceeds a predetermined amount, and an adjustable spring acting to close said inlet valve when the pump discharge pressure falls below a predetermined amount.

12. The combination with a constant speed variable output pressure pump, of a rockably mounted control member provided with a toothed segment, a control cylinder provided with a plunger having a rack coacting with said segment, a return spring for said plunger, a fluid seated exhaust valve for said cylinder subject to the discharge pressure of the pump, a spring coacting to open said exhaust valve when the pump discharge pressure falls below a predetermined amount, a pressure actuated inlet valve for said cylinder subject to the discharge pressure of the pump to be actuated thereby to open position when the pump discharge pressure exceeds a predetermined amount, a spring acting to close said inlet valve when the pump discharge pressure falls below a predetermined amount, and a manually adjustable flow regulating valve between said inlet valve and cylinder.

13. The combination with a constant speed variable output pressure pump, of a control member therefor provided with a segment, a control cylinder provided with a plunger having a rack coacting with said control member segment, a return spring for said plunger, a fluid seated exhaust valve for said cylinder subject to the discharge pressure of the pump, an adjustable spring coacting to open said exhaust valve when the pump discharge pressure falls below a predetermined amount, a pressure actuated inlet valve for said cylinder subject to the discharge pressure of the pump to be actuated thereby to open position when the pump discharge pressure exceeds a predetermined amount, and an adjustable spring acting to close said inlet valve when the pump discharge pressure falls below a predetermined amount.

14. The combination with a constant speed variable output pressure pump, of a control member therefor provided with a segment, a control cylinder provided with a plunger having a rack coacting with said control member segment, a return spring for said plunger, a fluid seated exhaust valve for said cylinder subject to the discharge pressure of the pump, a spring coacting to open said exhaust valve when the pump discharge pressure falls below a predetermined amount, a pressure actuated inlet valve for said cylinder subject to the discharge pressure of the pump to be actuated thereby to open position when the pump discharge pressure exceeds a predetermined amount, a spring acting to close said inlet valve when the pump discharge pressure falls below a predetermined amount, and a manually adjustable flow regulating valve between said inlet valve and cylinder.

15. The combination with a constant speed variable output pressure pump, and an output control member therefor, of a control cylinder provided with a plunger operatively associated with said pump control member, a return spring for said plunger, an exhaust valve for said cylinder associated with the discharge of the pump to be seated thereby when the discharge pressure exceeds a predetermined amount and adapted to open when the pressure falls below such predetermined amount, a cylinder inlet valve subject to the discharge pressure of the pump to be opened thereby when the pump discharge pressure exceeds a predetermined amount and adapted to close and to remain closed while the discharge pressure is below such predetermined amount, and a manually adjustable flow regulating valve between said inlet valve and cylinder.

16. The combination with a constant speed variable output pump and an output control member therefor, of a control cylinder provided with a plunger operatively associated with said control member, an exhaust valve for said cylinder associated with the discharge of the pump to be seated thereby when the discharge pressure exceeds a predetermined amount and adapted to open when the pressure falls below such predetermined amount, a cylinder inlet valve subject to the discharge pressure of the pump to be opened thereby when the pump discharge pressure exceeds a predetermined amount and adapted to close when the discharge pressure is below such predetermined amount, and a manually adjustable flow regulating valve between said inlet valve and said cylinder.

17. The combination with a constant speed variable output pump and an output control member therefor, of a control cylinder provided with a plunger operatively associated with said control member, an exhaust valve for said cylinder associated with the discharge of the pump to be seated thereby when the discharge pressure exceeds a predetermined amount and adapted to open when the pressure falls below such predetermined amount, a cylinder inlet valve subject to the discharge pressure of the pump to be opened thereby when the pump discharge pressure exceeds a predetermined amount and adapted to close when the discharge pressure is below such predetermined amount, said exhaust valve and said inlet valve being independent of each other, and independently adjustable spring means for each of said valves.

EUGENE HIGGINS.